US012235733B2

United States Patent
Schweppenhauser

(10) Patent No.: US 12,235,733 B2
(45) Date of Patent: Feb. 25, 2025

(54) DATA BACKUP DEVICE CONTROL

(71) Applicant: Klemens Schweppenhauser, Herdwangen-Schonach (DE)

(72) Inventor: Moritz Schweppenhauser, Herdwangen-Schonach (DE)

(73) Assignee: Klemens Schweppenhauser, Herdwangen-Schonach (DE)

( * ) Notice: Subject to any disclaimer, the term of this patent is extended or adjusted under 35 U.S.C. 154(b) by 0 days.

(21) Appl. No.: 18/690,985

(22) PCT Filed: May 18, 2022

(86) PCT No.: PCT/EP2022/063425
§ 371 (c)(1),
(2) Date: Mar. 11, 2024

(87) PCT Pub. No.: WO2023/041207
PCT Pub. Date: Mar. 23, 2023

(65) Prior Publication Data
US 2024/0264909 A1    Aug. 8, 2024

(30) Foreign Application Priority Data
Sep. 17, 2021    (DE) .......................... 102021124130.8

(51) Int. Cl.
*G06F 11/00* (2006.01)
*G06F 1/30* (2006.01)
*G06F 11/14* (2006.01)

(52) U.S. Cl.
CPC ............ *G06F 11/1461* (2013.01); *G06F 1/30* (2013.01); *G06F 11/1464* (2013.01)

(58) Field of Classification Search
None
See application file for complete search history.

(56) References Cited

U.S. PATENT DOCUMENTS

2005/0120251 A1*  6/2005  Fukumori ................. G06F 1/30
                                                            713/300
2014/0298061 A1* 10/2014  Volvovski ............ G06F 1/3268
                                                            713/323

(Continued)

FOREIGN PATENT DOCUMENTS

DE    102013103291 A1    5/2014
EP       0945801 A2      9/1999

OTHER PUBLICATIONS

Google Scholar/Patents search—text refined (Year: 2024).*

(Continued)

*Primary Examiner* — Christopher S McCarthy
(74) *Attorney, Agent, or Firm* — Christopher J. Volkmann; Kelly, Holt & Christenson, PLLC

(57) ABSTRACT

Data backup method, wherein the method comprises the following method steps:
  switching on an energy supply of a first data storage element of a data backup device by means of a control unit of the data backup device,
  activating a processing unit by means of the control unit,
  setting up a data connection between the processing unit and the first data storage element,
  setting up a data connection between the processing unit and a data memory,
  querying the data memory by means of the processing unit,
  storing the data queried from the data memory on the data storage element by means of the processing unit,
  deactivating the processing unit,
  switching off an energy supply of the first data storage element by means of the control unit, and data backup device for such a method.

13 Claims, 2 Drawing Sheets

(56) References Cited

U.S. PATENT DOCUMENTS

2018/0217772 A1     8/2018   White et al.
2019/0354475 A1    11/2019   Choi et al.

OTHER PUBLICATIONS

Search Report Written Opinion for PCT Application No. PCT/EP2022/063425, dated Sep. 22, 2022. 25 pages including English translation.
International Preliminary Report on Patentability for PCT Application No. PCT/EP2022/063425 dated Jul. 18, 2023, 31 pages including English translation.

* cited by examiner

DATA BACKUP DEVICE CONTROL

CROSS-REFERENCES TO RELATED APPLICATIONS

This Application is a Section 371 National Stage Application of International Application No. PCT/EP2022/063425, filed May 18, 2022, and published as WO 2023/041207A1 on Mar. 23, 2023, and claims priority to German Application No. 10 2021 124 130.8, filed Sep. 17, 2021, the contents of each are hereby incorporated by reference in their entirety.

BACKGROUND

Data backup devices for backing up data are already known. For reliable and secure data backup, in particular the regularity of the data backup, the location of the backed up data and the vulnerability to attack or the facilities for accessing the backed up data by an external third party are crucial.

A data backup of data onto a first hard disk, for example, is known, wherein this first hard disk is exchanged regularly, e.g. daily or weekly, with a further hard disk and the first hard disk is moved to a different location. A facility for a third party to access the data is thereby restricted, and, due to the different location of the first hard disk in relation to the location of the system from which the data originate, a certain data security is also guaranteed in terms of environmental influences, such as water or fire.

The disadvantage of this solution is the comparatively substantial manual effort required in order to implement the security.

DETAILED DESCRIPTION

Figure 1:
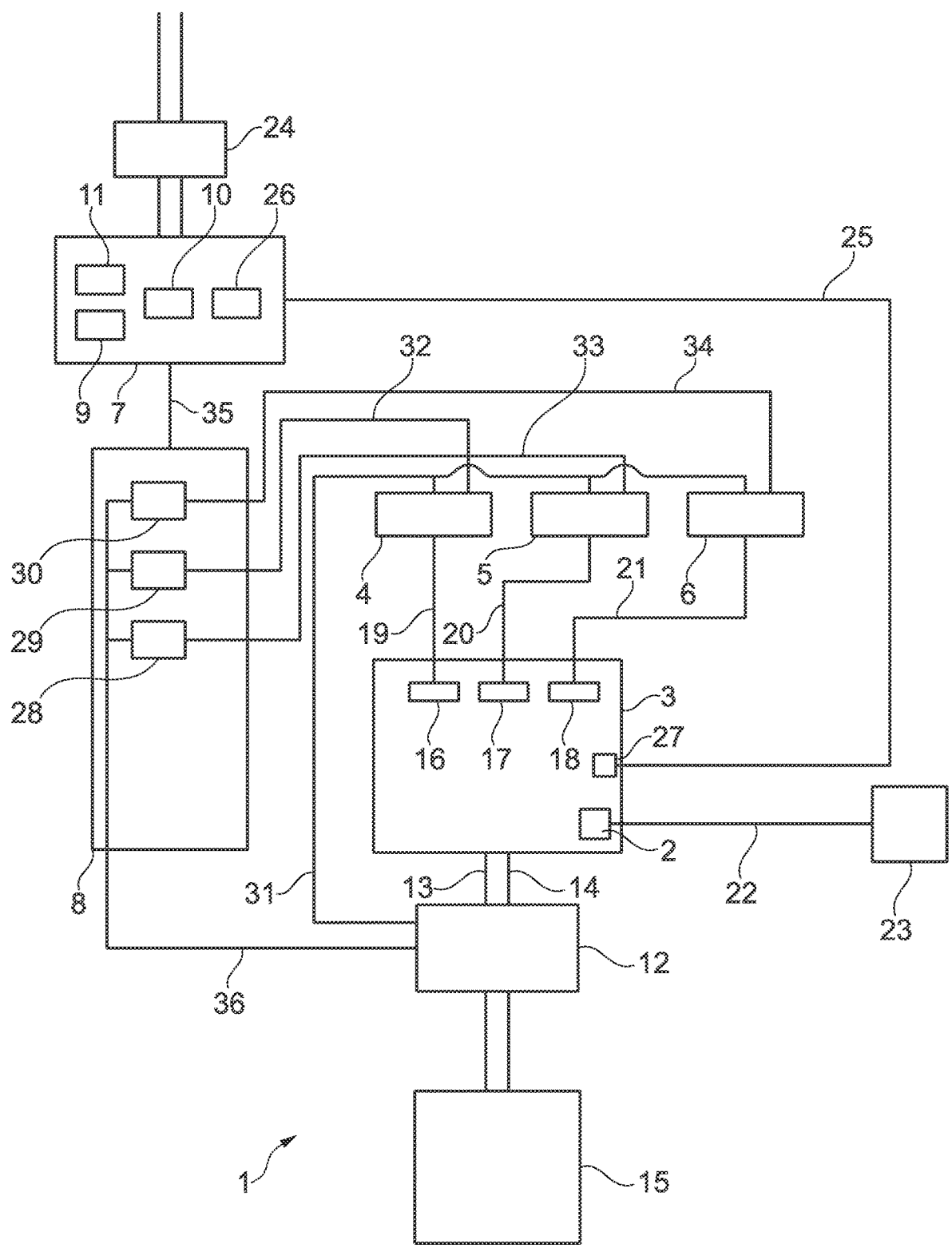
FIG. 1 shows a schematic view of data backup device.

The present disclosure is based on the object of providing an improved method for data backup. The object is, in particular, to provide an improved method for data backup by means of which the regular effort required for the data backup is reduced while maintaining a comparable standard of security.

This object is achieved by the features described herein.

Advantageous and appropriate embodiments of the present disclosure are indicated in the dependent claims.

The present disclosure is based on a data backup method, wherein the method comprises the following, for example consecutive, method steps:
  switching on an energy supply of a first data storage element of a data backup device by means of a control unit of the data backup device,
  activating a processing unit of the data backup device by means of the control unit,
  setting up a data connection between the processing unit and the first data storage element,
  setting up a data connection between the processing unit and a data memory,
  querying the data memory by means of the processing unit,
  storing the data queried from the data memory on the data storage element by means of the processing unit,
  deactivating the processing unit,
  switching off the energy supply of the first data storage element by means of the control unit.

A comparatively low-cost data backup, for example, in the form of a backup solution is thereby implementable, wherein the backup memory, e.g. the data storage elements, is activated by means of the solution only when a backup is being written. Security, for example, is increased as a result.

The method comprises, for example, one of the following further method steps:
  switching on an energy supply of the, for example single, first data storage element of the data backup device by means of a control unit of the data backup device if a time of a time setting unit has reached a set time,
  disconnecting the data connection between the processing unit and the first data storage element and disconnecting the data connection between the processing unit and data memory,
  checking, by means of the control unit, whether the processing unit is switched off, deactivated and/or shut down.

A regular, in particular automatic, data backup, for example, can thereby be made available.

Deactivating the processing unit is understood to mean, for example, switching off the processing unit. Deactivating the processing unit is understood to mean, for example, disconnecting the energy supply.

It is further conceivable for the energy supply of a data storage element and/or of the processing unit to be switched on and/or switched off manually and/or by an external device and therefore independently from a time of the time setting unit. It is furthermore also conceivable for a data backup by the processing unit to be activated or instigated manually or by an external device according to the aforementioned method.

It is further proposed that the data backup method comprises the further, for example consecutive, method steps:
  querying a time of a time setting unit of the data backup device by means of the control unit of the data backup device,
  synchronizing the queried time of the time setting unit with a set time stored in the control unit by means of a control module of the control unit.

The control unit is designed, for example, to query the time of the time setting unit continuously. The control module of the control unit is designed, for example, to query the time of the time setting unit continuously. It is also conceivable for the time setting unit to transmit or provide a time of the time setting unit continuously, e.g. at regular time intervals, to the control unit, for example to the control module of the control unit.

The method comprises, for example, the following further method steps:
  continuously or cyclically querying a time of a time setting unit of a data backup device by means of the control unit of the data backup device,
  continuously or cyclically synchronizing the queried time of the time setting unit with a set time stored in the control unit by means of a control module of the control unit.

The control unit, for example, continuously, e.g. always, synchronizes the queried or provided time of the time setting unit with a set time stored in the control unit, for example in a storage module of the control unit. A plurality of set times, for example, are stored in the control module, and the control unit checks continuously whether a time of the time setting unit has reached one of the stored set times. A daily or weekly data backup, for example, is thereby implemented. The control unit comprises, for example, a storage unit on which the set time is stored.

It is further proposed that the data backup method comprises the further, for example consecutive, method steps:
switching on an energy supply of a second data storage element of the data backup device by means of the control unit if a time of the time setting unit has reached a further set time,
activating the processing unit by means of the control unit,
setting up a data connection between the processing unit and the second data storage element,
setting up the data connection between the processing unit and the data memory and/or a further data memory,
querying the data memory by means of the processing unit,
storing the data queried from the data memory on the second data storage element by means of the processing unit,
switching off, deactivating and/or shutting down the processing unit,
switching off an energy supply of the second data storage element by means of the control unit.

A data backup, for example, is thereby implemented, by means of which a plurality of data backup times can be provided in order to be able to access, if required, one of the times for restoring data on the basis of the respective data backup.

The control unit is advantageously designed to supply only a single data storage element with energy, while all further data storage elements are de-energized by the control unit.

The control unit is designed, for example, to supply the data storage element cyclically with power or with energy. The control unit, for example, synchronizes the time of the time setting unit with a set time and activates the power supply of a single data storage element, e.g. the first data storage element, when the set time is reached, wherein the control unit is designed to switch off the power supply of all remaining data storage elements, e.g. of the second data storage element, so that only a single data storage element is always supplied simultaneously with power or energy by the control unit. The control unit is designed, for example, to de-energize all data storage elements after a data storage has ended. It is conceivable for the control unit to check whether the processing unit has ended the data storage and is deactivated, and de-energizes the data storage element, for example all data storage elements, only after the deactivation of the processing unit. The control unit, for example, checks the status of the processing unit cyclically or continuously.

The control unit is designed, for example, in such a way that the control unit, on reaching a set time, activates the existing data storage elements on a rolling or periodic basis. The data backup device comprises e.g. seven data storage elements and seven set times for each week, e.g. a set time for each weekday, so that, in each week, the first data storage element is activated e.g. on a Monday and the data from a data memory are always stored on Mondays on the first data storage element, the second data storage element is activated e.g. on a Tuesday, and the data from a data memory are always stored on Tuesdays on the second data storage element, etc.

The set time is present, for example, as a cycle, e.g. every 12 hours, every 24 hours, every 7 days and/or every month. A set start time, for example, at which the cycle begins when the time of the time setting unit reaches or exceeds the set time, is defined by the set time.

The proposed data backup method comprises, for example, the following steps, wherein the method steps are carried out consecutively in the specified sequence:
continuously or cyclically querying the time of the time setting unit of a data backup device by means of the control unit of the data backup device,
continuously or cyclically synchronizing the queried time of the time setting unit with the set time stored in the control unit by means of the control module of the control unit,
switching on the energy supply of the first data storage element of the data backup device by means of the control unit of the data backup device if the time of the time setting unit has reached a set time,
activating the processing unit by means of the control unit,
setting up a data connection between the processing unit and the first data storage element,
setting up a data connection between the processing unit and a data memory,
querying the data memory by means of the processing unit,
storing the data queried from the data memory on the data storage element by means of the processing unit,
disconnecting the data connections between the processing unit and the first data storage element and the data memory,
deactivating the processing unit,
switching off the energy supply of the first data storage element by means of the control unit.

It is further conceivable for the processing unit to set up a data connection, e.g. cyclically, to different data memories. The processing unit, for example, after reaching or exceeding a first set time, sets up a data connection to a first data memory and stores the data from the first data memory on the first data storage element and, after reaching or exceeding a further, e.g. a second, set time, sets up a data connection to a further, e.g. a second, data memory and stores the data from this further data memory on the first or a further, e.g. a second, data storage element. The aforementioned method runs, for example, cyclically. A data backup of different data memories or data storage systems, for example, is thereby implementable.

A data backup device is further proposed, wherein the data backup device is designed to carry out a method according to one of the aforementioned variants, wherein the data backup device has a data interface, wherein the data backup device is connectable by means of the data interface to a data memory, wherein the data backup device has a processing unit, wherein the data backup device has two or more data storage elements, wherein the data storage elements are designed to store data from the data memory, wherein the processing unit is designed to connect the data backup device via the data interface to the data memory, to query data from the data memory and store said data on one of the data storage elements of the data backup device, wherein the data backup device has a control unit, wherein the control unit comprises a switching device, a time setting unit and a control module, wherein the data storage elements have an electrically conducting connection to the switching device and are supplied with energy exclusively by the switching device, wherein each data storage element is connected to the switching device by means of a separate power line so that each data storage element is separately suppliable with energy by the switching device, wherein the time setting unit outputs a time to the control module.

The control module is designed, for example, to activate the switching device depending on a time of the time setting unit so that an energy supply of a data storage element is activated or deactivated. The time setting unit is designed, for example, as a real-time clock and/or as a time server. The control unit is designed, for example, to receive a time signal from the time server. It is also conceivable for the control unit to have a GPS module and to synchronize a signal, in particular a time signal, of the GPS module.

The data backup device has, for example, one, two, three, four, five, six, seven or more data storage elements. The control unit is designed, for example, to activate the processing unit depending on a time of the time setting unit and to activate or switch on the power supply of one, for example a single one, of the data storage elements simultaneously, temporally before or temporally thereafter. The data storage elements are advantageously present as physically separated. The data storage elements are, for example, of similar, for example identical, design. One data storage element is present, for example, as a data memory, e.g. as a hard disk. A first data storage element can also comprise, for example, a plurality of data memories, e.g. a plurality of hard disks, which are logically interlinked as one storage unit. A storage space, for example, which is larger than the storage place of a single data memory is thereby definable. As a result, for example, comparatively large data images can be stored and/or costs can be comparatively reduced. It is also conceivable for a data storage element to have a hard disk array, e.g. in the form of a network memory, e.g. in the form of an NAS system. The storage size of the data storage element, for example, is advantageously increased by designing a data storage element as a hard disk array.

The data memory is designed, for example, as a network memory. Backup data, for example, are stored in the data memory, e.g. in the form of a backup. The processing unit is designed, for example, to query the backup data from the data memory.

The data interface is designed, for example, as a network interface, e.g. as an RJ45 interface or as a WLAN interface. However, it is also conceivable for the data interface to be present in the form of a USB interface and/or a mobile radio interface, e.g. an LTE interface.

The processing unit is designed, for example, as a computing unit, e.g. as a computer or as a server. The data storage elements are, for example, hard disks of the computer and are connected to the computing unit by means of standard data interfaces, e.g. in the form of an IDE, eSATA and/or SATA interface.

All data storage elements, for example, or a plurality of data storage elements are connected by means of a single standard data interface to the processing unit. All data storage elements, for example, or a plurality of data storage elements are connected by means of a single serial SATA bus to the processing unit. This has the advantage that a single interface controller is required on the processing unit, thus offering a cost benefit. Since only one data storage element is ever supplied with energy, all data memories can, for example, be connected to the same interface bus in a parallel circuit arrangement.

A data bus cable, for example, runs from the processing unit to a last data storage element. The data bus cable branches off, for example, before the last data storage element on a first branch (T-interface), wherein the data bus cable runs from the first branch to a first data storage element. A further data bus cable, for example, which runs to a second data storage element, branches off after the first branch and before the last data storage element on the data bus cable at a second branch (T-interface). Any number of branches, for example, are present on the data bus cable between the last data storage element and the first branch. The data bus cable runs, for example, from each branch to a data storage element. The data storage elements are thereby interconnected with the processing unit via a parallel circuit by means of the data bus cable.

It is conceivable for the data bus cable, the branches and the ends of the data bus cable continuing to run from the branches to be present in one piece, in particular inseparable from one. It is conceivable for the data bus cable to be present in the form of a conductor path on a printed circuit board.

The data bus cable comprises, for example, five or seven wires. The data bus cable comprises, for example, precisely five or precisely seven wires. Seven conductor paths, for example, are present on the printed circuit board for the data bus cable. The data bus cable comprises, for example, four wires for the data transmission and at least one wire for the transmission to ground. It is conceivable for the data bus cable to have three wires for the transmission to ground.

It is conceivable for the processing unit to have a hard disk controller. The hard disk controller is connected, for example, to each of the data storage elements. It is conceivable for the hard disk controller to be connected via a parallel circuit to the data storage elements. The hard disk controller is connected, for example, to all data storage elements. It is further conceivable for an energy supply of the hard disk controller to be switchable by means of the switching device. The security of the data backup device is increased as a result. The hard disk controller is, for example, part of the processing unit. However, it is also conceivable for the hard disk controller to be present in the form of an element that is separate from the processing unit, and to be connected to the processing unit by means of a control line.

It is also conceivable for the data backup device to be present as spatially distanced from the data memory, e.g. in a different building. It is also conceivable for the data backup device to be connectable to the data memory by means of the data interface via a network, e.g. via the Internet. It is also conceivable for the processing unit and the data storage elements to be present as spatially distanced. It is further conceivable for the processing unit and the control unit to be present as spatially distant, e.g. in different buildings. The processing unit is located, for example, in a first building, e.g. together with the data memory, and the control unit is located together with the data storage elements in a further building. It is conceivable for the data connection between the processing unit and the data storage elements to be set up via a network, e.g. via the Internet.

It is furthermore proposed that an emergency power supply unit is present and is connected to the control unit so that an energy supply of the control unit is ensured in the event of a power failure. It is thereby ensured, for example, that a comparison of the time of the time setting unit with a set time is carried out at all times and a predefined start of a data backup is therefore performed by the control unit even during or after a power failure.

It is also proposed that an emergency power supply unit is present and is connected to the data backup device so that an energy supply of the data backup device is ensured in the event of a power failure. Is conceivable for a single emergency power supply unit to be present in order to supply both the control unit and the processing unit with energy in the event of a power failure.

The emergency power unit is connected, for example, via the control unit to the data storage elements so that the data storage elements are supplied with energy in the state activated by the control unit.

It also proves to be advantageous for each data storage element to have an electrically conducting connection to the control unit so that the control unit can supply each data storage element with energy.

Each data storage element has an electrically conducting connection, for example, to the switching device. Each data storage element has an electrically conducting connection, for example, exclusively to the switching device. It is thereby ensured, for example, that a single data storage element is activatable in each case by the control unit and is therefore suppliable with energy, and the remaining data storage elements are de-energized by the control unit. The switching device is designed, for example, in such a way that the switching device can only ever activate and supply energy to a single data storage element, while the remaining data storage elements are de-energized or are de-energized through activation of a storage element.

It is further proposed that the switching device has switching elements, wherein an energy supply of a data storage element is switchable by means of a switching element. The switching device has, for example, switching elements, wherein an energy supply of a data storage element is switchable by means of a single switching element. A switching element is present, for example, as a relay and/or as an electrical switch. An energy supply of a data storage element is thereby physically switchable on or off.

The control unit is advantageously designed to supply only a single data storage with energy by switching a switching element of the switching device element, whereas each further data storage element is de-energized by the control unit by switching a further switching element of the switching device. The control unit is designed, for example, to supply the data storage element with power or with energy cyclically by switching a switching element. The control unit is designed, for example, to de-energize all data storage elements by switching the switching elements of the switching device after a data storage has ended.

The switching device comprises, for example, a circuit, e.g. a circuit logic, so that, by switching one switching element by means of which an electric circuit is closed, the remaining switching elements are switched in such a way that the electric circuits of these switching elements are opened.

It is similarly proposed that the switching device is designed to supply only a single data storage element with energy, and that an energy supply of all remaining further data storage element is present in a switched off state.

The switching device is designed, for example, to carry out a method as specified above, so that, when a set time is reached and/or exceeded, a single first data storage element is supplied with energy, wherein the data storage elements are always present as disconnected from the energy supply before a set time is reached and/or exceeded. The switching device, for example, activates the processing unit following the activation of the first data storage element, as a result of which the above-mentioned storage procedure of the processing unit is initiated and carried out. The processing unit deactivates itself, for example, after the end of the storage procedure. The control unit of the switching device queries, in particular cyclically, the state of the processing unit or the processing unit transmits a signal to the control unit after the end of the storage procedure so that the control unit disconnects the first data storage element from the energy supply after the end of the storage procedure. The switching device, for example, activates a further, e.g. second, data storage element different from the first data storage element as soon as a further set time is reached and/or exceeded, and the process described above starts all over again. The process is repeated, for example, for all present data storage elements after a set time is reached and/or exceeded, until each data storage element has data written to it. The process then starts all over again, for example, i.e. the first data storage element is again supplied with energy after a further set time is reached and/or exceeded, and the data queried from the data memory are stored in the first data storage element. The first data storage element, for example, is overwritten here, or the data are additionally stored on a free memory space of the first data storage element.

A further embodiment of the present disclosure is a system comprising a data backup device according to one of the aforementioned design variants, wherein the system is designed to carry out the method according to one of the aforementioned variants.

FIG. 1 shows schematically a data backup device 1. The data backup device 1 comprises, for example, a data interface 2, a processing unit 3, data storage elements 4-6 and a control unit 7. The processing unit 3 is connected, for example, via a data line 22 to a data memory 23.

The control unit 7 has, for example, a switching device 8, a time setting unit 9 and a control module 10. It is further conceivable for the control unit 7 to comprise a memory module 11.

The processing unit 3 is supplied with energy, for example, via a power supply unit 12 and via energy lines 13, 14. The power supply unit 12 is connected, for example, by means of an uninterruptible emergency power supply unit (UPS) 15 to a power supply network (not shown). As a result, for example, an energy supply of the processing unit 3 is provided and a data backup is therefore guaranteed even in the event of a power failure in the power supply network.

The processing unit 3 is present, for example, in the form of a computer, e.g. a server. It is conceivable for the processing unit 3 to contain the data storage elements 4-6. The data storage elements 4-6 are present, for example, as installed in a housing of the processing unit 3 (not shown).

It is further conceivable for the control unit 7 to be connected by means of a further uninterruptible emergency power supply unit (UPS) 24 to a power supply network (not shown). As a result, for example, an energy supply of the control unit 7 is provided and a scheduled data backup is therefore guaranteed even in the event of a power failure in the power supply network. It is also conceivable for the emergency power supply unit 24 and the emergency power supply unit 15 to be identical and therefore for a single emergency power supply unit to provide an uninterruptible power supply for both the processing unit 3 and the control unit 7.

The processing unit 3 comprises, for example, interfaces 16-18, wherein the data storage elements 4-6 are connected via data lines 19-21 to the processing unit 3 at the interfaces 16-18. The data storage elements 4-6 are present, for example, in the form of hard disks. It is conceivable for the interfaces 16-18 of the processing unit 3 to be designed as USB, IDE, eSATA and/or SATA interfaces.

The control unit 7 is connected, for example, by means of a data line 25 to the processing unit 3. The data line 25 comprises, for example, a plurality of wires or cables. It is conceivable for the control unit 7 to be able to exchange data and/or signals via a data interface 26 of the control unit 7 with the processing unit 3 via the data line 25. The data line 25 is coupled, for example, to a data interface 27 of the processing unit 3. The data interfaces 26, 27 can be present in the form of both digital and/or analog interfaces.

The control unit 7 is coupled, for example, via a data line and/or energy line 35 to the switching device 8. A control and/or regulation of the switching device 8 by the control unit 7, for example, is thereby implementable.

The switching device 8 comprises, for example, switching elements 28-30. Each switching element 28-30 is present, for example, in the form of a switch. The data storage elements 4-6 are connected, for example, via a first power line 31 to the power supply unit 12 and via second power lines 32-34 in each case to a switching element 28-30. The switching elements 28-30 are connected, for example, via a further power line 36 to the power supply unit 12. An energy supply or power supply of a data storage element 4-6 is thereby guaranteed only if the respective switching element 28-30 closes the electric circuit to the data storage element 4-6 via the power lines 31, 32, 36; 31, 33, 36 or 31, 34, 36.

The switching device 8 is designed, for example, in such a way that only one switching element 4-6 can ever close the electric circuit to the respective data storage element 4-6 and the other two switching elements 4-6 are in this case blocked, as a result of which they cannot close this electric circuit. As a result, for example, the processing unit 3 can only ever recognize one data storage element 4-6 and store data on it, since the other data storage elements 4-6 are de-energized and are not therefore operating. A control or regulation, for example, which selects the data storage element 4-6 on which data are intended to be stored is thereby predefinable, for example exclusively, by means of the control device 7.

Figure 2:
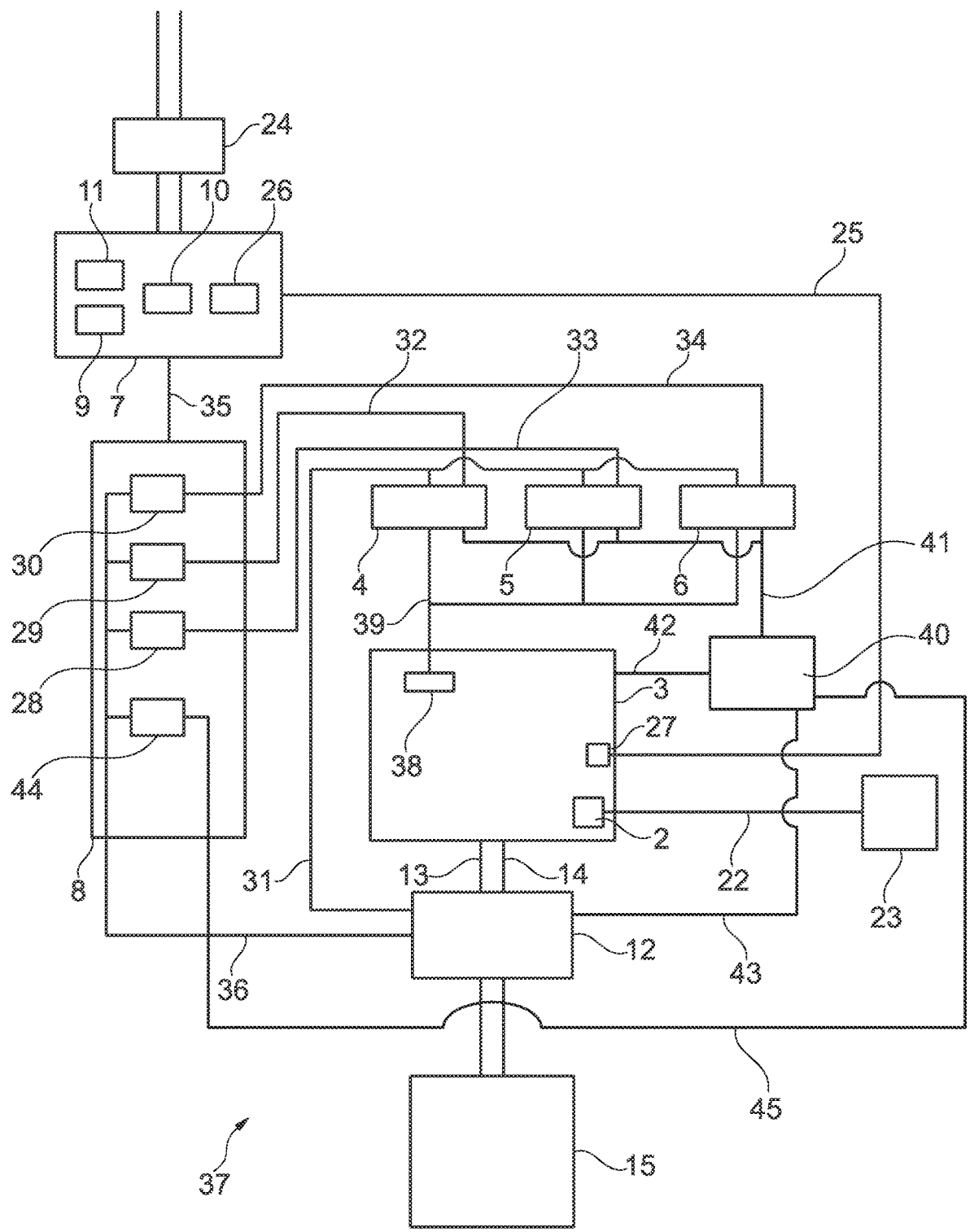
FIG. 2 shows a schematic view of a further variant of a data backup device.

FIG. 2 shows a further variant of a data backup device 37. Elements are denoted with the same reference signs in FIG. 2 for easier understanding.

The design variant of the data backup device 37 differs from the data backup device 1, for example, in the use of a single interface 38 via which the data storage elements 4-6 are connected to an, in particular single, data line 39.

All data storage elements 4-6, for example, or a plurality of data storage elements 4-6 are connected by means of a single interface 38 to the processing unit 3. This has the advantage that a single interface controller 40 is required on the processing unit 3, thus offering a cost benefit. The data backup device 37, e.g. the processing unit 3, has, for example, has a single interface 38. The data storage elements 4-6, e.g. all data storage elements 4-6, are connected, for example via a data line 39 to a single interface 38.

It is conceivable for the processing unit 3 to have an interface controller 40. The interface controller 40 is connected, for example, to each of the data storage elements 4-6. It is conceivable for the interface controller 40 to be connected via a parallel circuit 41 to the data storage elements 4-6. The interface controller 40 is connected, for example, to all data storage elements 4-6. The interface controller 40 is present e.g. in the form of a hard disk controller.

It is further conceivable for an energy supply of the interface controller 40 to be switchable by means of the switching device 8. The security of the data backup device is increased as a result. The interface controller 40 is connected, for example, via an energy line 43 to the power supply unit 12. The switching device 8 has, for example, a switching element 44 by means of which the interface controller 40 is switchable via an energy line 45. The interface controller 40 is, for example, part of the data backup device 37. The interface controller 40 is present, e.g. in the form of an element that is separate from the processing unit 3. The interface controller 40 is connected, for example, to the processing unit 3 by means of a control line 42.

Although the present invention has been described with reference to preferred embodiments, workers skilled in the art will recognize that changes may be made in form and detail without departing from the spirit and scope of the invention.

REFERENCE SIGN LIST

1 Data backup device
2 Data interface
3 Processing unit
4 Data storage element
5 Data storage element
6 Data storage element
7 Control unit
8 Switching device
9 Time setting unit
10 Control module
11 Storage module
12 Power supply unit
13 Energy line
14 Energy line
15 Emergency power supply unit
16 Interface
17 Interface
18 Interface
19 Data line
20 Data line
21 Data line
22 Data line
23 Data memory
24 Emergency power supply unit
25 Data line
26 Data interface
27 Data interface
28 Switching element
29 Switching element
30 Switching element
31 Power line
32 Power line
33 Power line
34 Power line
35 Data line and/or energy line
36 Power line
37 Data backup device
38 Interfaces
39 Data line
40 Interface controller
41 Parallel circuit
42 Control line
43 Energy line
5 44 Switching element
45 Energy line

The invention claimed is:

1. A data backup method comprising:
switching on an energy supply of a first data storage element of a data backup device by a control unit of the data backup device,
activating a processing unit by the control unit,
setting up a data connection between the processing unit and the first data storage element, setting up a data connection between the processing unit and a data memory, querying the data memory by the processing unit, storing data, queried from the data memory, on the first data storage element by the processing unit, deactivating the processing unit while the control unit of the data backup device remains active, wherein deactivating the processing unit comprises disconnecting the processing unit from the energy supply, deenergizing the first data storage element by the control unit.

2. The data backup method as claimed in claim 1, wherein the data backup method comprises:

querying a time of a time setting unit of the data backup device by the control unit of the data backup device, synchronizing the queried time of the time setting unit with a set time stored in the control unit by a control module of the control unit.

3. The data backup method as claimed in claim 2, wherein the data backup method comprises:

switching on an energy supply of a second data storage element of the data backup device by the control unit if a time of the time setting unit has reached a further set time, activating the processing unit by the control unit, setting up a data connection between the processing unit and the second data storage element, setting up the data connection between the processing unit and the data memory or a further data memory, querying the data memory by the processing unit, storing data, queried from the data memory, on the second data storage element by the processing unit, deactivating the processing unit, switching off an energy supply of the second data storage element by the control unit.

4. The data backup device as claimed in claim 1, wherein deenergizing the first data storage element comprises switching off energy supply of the first data storage element after the processing unit is disconnected from the energy supply.

5. A data backup device, comprising:

an energy supply;

a data interface;

a processing unit, configured to connect the data backup device via the data interface to a data memory;

two or more data storage elements, wherein each data storage element of the two or more data storage elements, is configured to store data from the data memory, wherein the processing unit is configured to query data from the data memory and store said data on a first data storage element of the two or more data storage elements of the data backup device;

a control unit, comprising a switching device, a time setting unit, and a control module, wherein the two or more data storage elements have an electrically conducting connection to the switching device and are supplied with energy exclusively by the switching device, wherein each data storage element, of the two or more data storage elements, is connected to the switching device by a separate power line so that each data storage element is separately suppliable with energy from the energy supply by the switching device, wherein the time setting unit outputs a time to the control module, wherein the control unit is configured to:

deactivate the processing unit while the control unit of the data backup device remains active, wherein the processing unit is deactivated by disconnecting the processing unit from the energy supply; and deenergize the first data storage element.

6. The data backup device as claimed in claim 5, and further comprising an emergency power supply unit connected to the control unit so that an energy supply of the control unit is ensured in event of a power failure.

7. The data backup device as claimed in claim 5, and further comprising an emergency power supply unit connected to the data backup device so that a supply of energy to the control unit is ensured in event of a power failure.

8. The data backup device as claimed in claim 5, wherein each data storage element, of the two or more data storage elements, has an electrically conducting connection to the control unit so that the control unit is configured to supply each data storage element, of the two or more data storage elements, with energy.

9. The data backup device as claimed in claim 5, wherein the switching device has switching elements, wherein an energy supply of a data storage element is switchable by a switching element.

10. The data backup device as claimed in claim 5, wherein the switching device is designed to supply only a single data storage element with energy, and an energy supply of all remaining further data storage elements is present in a switched off state.

11. The data backup device as claimed in claim 5, wherein the processing unit has a standard data interface, wherein all data storage elements are connected to the standard data interface via a single data bus, wherein the single data bus connects the two or more data storage elements by a parallel circuit to the standard data interface.

12. The data backup device as claimed in claim 5, wherein the control unit is configured to deenergize each data storage element, of the two or more data storage elements, after the processing unit is disconnected from the energy supply.

13. A system comprising a data backup device as claimed in claim 5, wherein the system carries out the data backup method as claimed in claim 1.

* * * * *